United States Patent [19]
Montalvo, III et al.

[11] Patent Number: 5,178,235

[45] Date of Patent: Jan. 12, 1993

[54] MODULAR BRAKES AND CLUTCHES

[75] Inventors: William W. Montalvo, III, Raymond; Philip R. Metcalf, Jr., New Sharon, both of Me.

[73] Assignee: The Montalvo Corporation, Portland, Me.

[21] Appl. No.: 931,432

[22] Filed: Aug. 18, 1992

Related U.S. Application Data

[63] Continuation of Ser. No. 713,612, Jun. 11, 1991, abandoned, which is a continuation of Ser. No. 389,049, Aug. 2, 1989, abandoned.

[51] Int. Cl.$^5$ .................. F16D 55/18; F16D 13/00
[52] U.S. Cl. .................. 188/18 A; 188/72.4; 188/73.1; 188/73.2; 188/73.32; 188/250 G; 188/366; 188/370; 188/264 A; 188/71.6; 192/85 A; 192/107 R; 192/70.13
[58] Field of Search .......... 188/18 A, 73.1, 73.2, 188/73.32, 250 G, 250 B, 250 R, 264 R, 264 A, 264 AA, 71.1, 71.3, 71.4, 72.4, 72.5, 72.6, 71.6, 370, 366, 367, 170-171, 161, 152, 71.5, 72.7, 218 XL, 218 R; 192/85 A, 85 AA, 107 R, 70.13, 113 R, 113 A

[56] References Cited

U.S. PATENT DOCUMENTS

| | | | |
|---|---|---|---|
| 1,300,898 | 4/1919 | Vincent | 192/85 A |
| 2,297,480 | 9/1942 | Kratzmann | 192/85 A |
| 2,465,810 | 3/1949 | MacDonald et al. | 192/85 A X |
| 2,656,905 | 10/1953 | Langdon | 188/366 X |
| 2,785,781 | 3/1957 | Johansen | 192/70.13 X |
| 3,185,256 | 5/1965 | Schilling | 192/85 AA X |
| 3,202,252 | 8/1965 | Schilling | 192/85 A |
| 3,388,775 | 6/1968 | Baynes et al. | 188/73.32 |
| 3,527,329 | 9/1970 | Jordan | 188/366 X |
| 3,584,717 | 6/1971 | Wyckoff et al. | 192/70.13 X |
| 3,610,380 | 10/1971 | Montalvo, III | 192/85 AA |
| 3,885,650 | 5/1975 | Klaue | 188/73.32 X |
| 3,964,583 | 6/1976 | Montalvo | 188/73.34 X |
| 4,366,884 | 1/1983 | Montalvo, Jr. | 188/370 X |
| 4,427,102 | 1/1984 | Schilling | 192/85 A |
| 4,457,408 | 7/1984 | Montalvo, III | 188/72.7 X |
| 4,474,268 | 10/1984 | Dayen | 188/264 AA X |
| 4,830,164 | 5/1989 | Hays | 188/250 G X |
| 4,860,865 | 8/1989 | Montalvo, III et al. | 188/71.3 X |
| 4,913,266 | 4/1990 | Russell et al. | 188/264 A X |

FOREIGN PATENT DOCUMENTS

| | | | |
|---|---|---|---|
| 6479431 | 3/1989 | Japan | 188/73.2 |
| 2172056 | 9/1986 | United Kingdom | 188/72.4 |

OTHER PUBLICATIONS

Montalvo, "The Answers to Tomorrows Converting Needs Today!", printed 1981, cover and p. 2 of brochure.

Primary Examiner—Douglas C. Butler
Attorney, Agent, or Firm—Brooks Haidt Haffner & Delahunty

[57] ABSTRACT

A single disc, single acting brake or clutch has one or more pneumatically actuated piston and cylinder assemblies for urging friction material into contact with a disc that is rotatable relative to a body which carries the piston and cylinder assembly.

4 Claims, 4 Drawing Sheets

MODULAR BRAKES AND CLUTCHES

This application is a continuation of application Ser. No. 713,612, filed Jun. 11, 1991, now abandoned, which is a continuation of Ser. No. 389,049, filed Aug. 2, 1989, and now abandoned.

BACKGROUND OF THE INVENTION

1. Field of the Invention

This invention relates to brakes and clutches having a special hub structure and permitting easy maintenance.

2. Discussion of the Prior Art

U.S. Pat. No. 4,860,865 discloses a double disc brake or clutch wherein friction pads are readily removable. Other arrangements for quick change of brake shoes are shown in U.S. Pat. No. 3,388,775 to Baynes et al. and in Klaue U.S. Pat. No. 3,885,650. The desirability of being able to remove and replace worn friction material easily has been recognized.

It has also been known that the use of interchangeable parts in brakes and clutches is desirable, as shown, for example in U.S. Pat. No. 3,964,583 to Montalvo.

SUMMARY OF THE INVENTION

A single disc, single acting brake or clutch can incorporate one or more pneumatically actuated piston and cylinder assemblies for urging friction material into contact with a disc rotatable relative to the body which carries the piston and cylinder assemblies.

When operated as a brake, a stationary body is engaged with a rotating body to stop the motion thereof. When operated as a clutch, upon engagement, the two bodies move together.

The friction coupling mechanism of the present invention has a novel hub which can be used in either a brake or a clutch configuration, thus reducing the necessary inventory of replacement parts. Identical piston and cylinder assemblies, discs and mounting spiders can also be used in either brakes or clutches.

The piston and cylinder assembly (or assemblies) is mounted on a spider. In the case of a brake the spider is fixed to a machine frame. In the case of a clutch the spider is mounted on a rotatable shaft. In either case, friction material carried on the outer face of the piston is moved upon actuation into engagement with an opposed disc, which is preferably finned for heat dissipation.

The central hub of the assembly is so structured that in one position it can be used in a brake configuration and in a reversed position, the hub can function in a clutch. Adapter 33, bearing 35, adapter fastener 34 are added for the in-drive function as a clutch.

These simplifications, together with easy removal of friction material, provide for economical service and replacement of parts.

One or more piston and cylinder assemblies, which have disc-shaped cylinder base plates, are mounted by means of screws on a spider. These piston and cylinder assemblies have hollow cylindrical torque posts extending from the cylinder base plates and attached thereto by removable screws. The torque posts hold generally disc-shaped pads of friction material in place, so that the removal of a torque post makes it possible to remove the friction pad by sliding the pad radially outward.

Upon removal of an air fitting through which air under pressure enters the cylinder to actuate the piston, and removal of mounting screws, the entire piston and cylinder assembly, including the cylinder base plate, can be removed for service.

The friction material pads face a finned disc against which they are pushed when air under pressure is fed into the cylinders to engage the brake or clutch. When air pressure is relieved the friction pads retract and disengage.

When the central hub of the mechanism is secured to a rotatable shaft and the spider is attached to a machine frame, the mechanism operates as a brake. When the hub position is reversed and the hub is attached to the spider, a sprocket adapter mounts the finned disc to a driven shaft and the mechanism functions as a clutch. Upon engagement, the driven shaft rotates the hub, which in turn rotates the finned disc and the spider rotates therewith.

Thus the device can function as either a brake or a clutch, because of its reversible hub.

These and other objects and advantages of the single disc friction coupling mechanism of the invention will be more fully understood from the following detailed description of the invention when that description is read in view of the accompanying drawing figures.

BRIEF DESCRIPTION OF THE DRAWINGS

In the drawings, like reference numerals designate like parts.

DETAILED DESCRIPTION OF PREFERRED EMBODIMENTS

Figure 1:
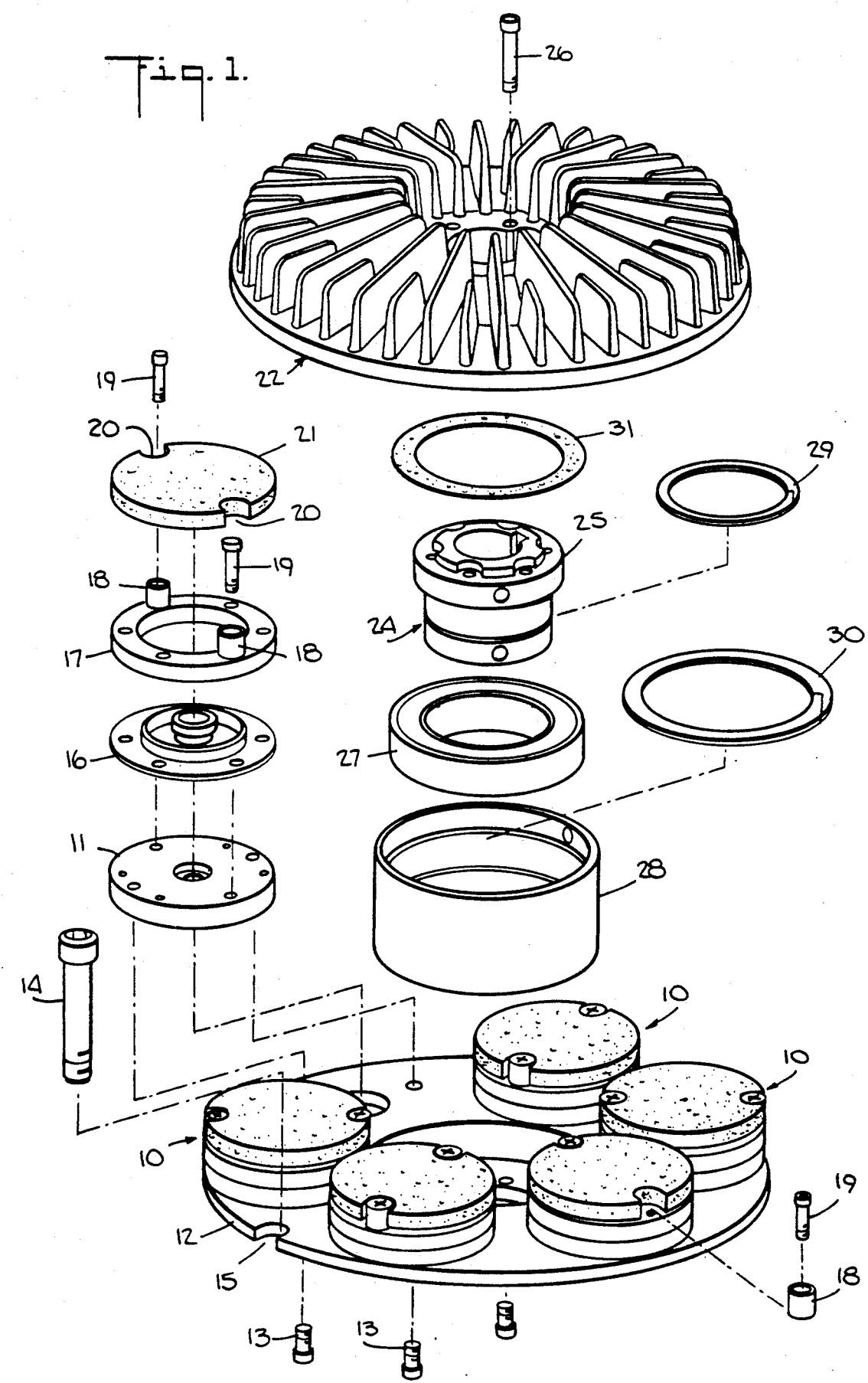
FIG. 1 is an exploded view of a brake according to the invention.
Figure 2:
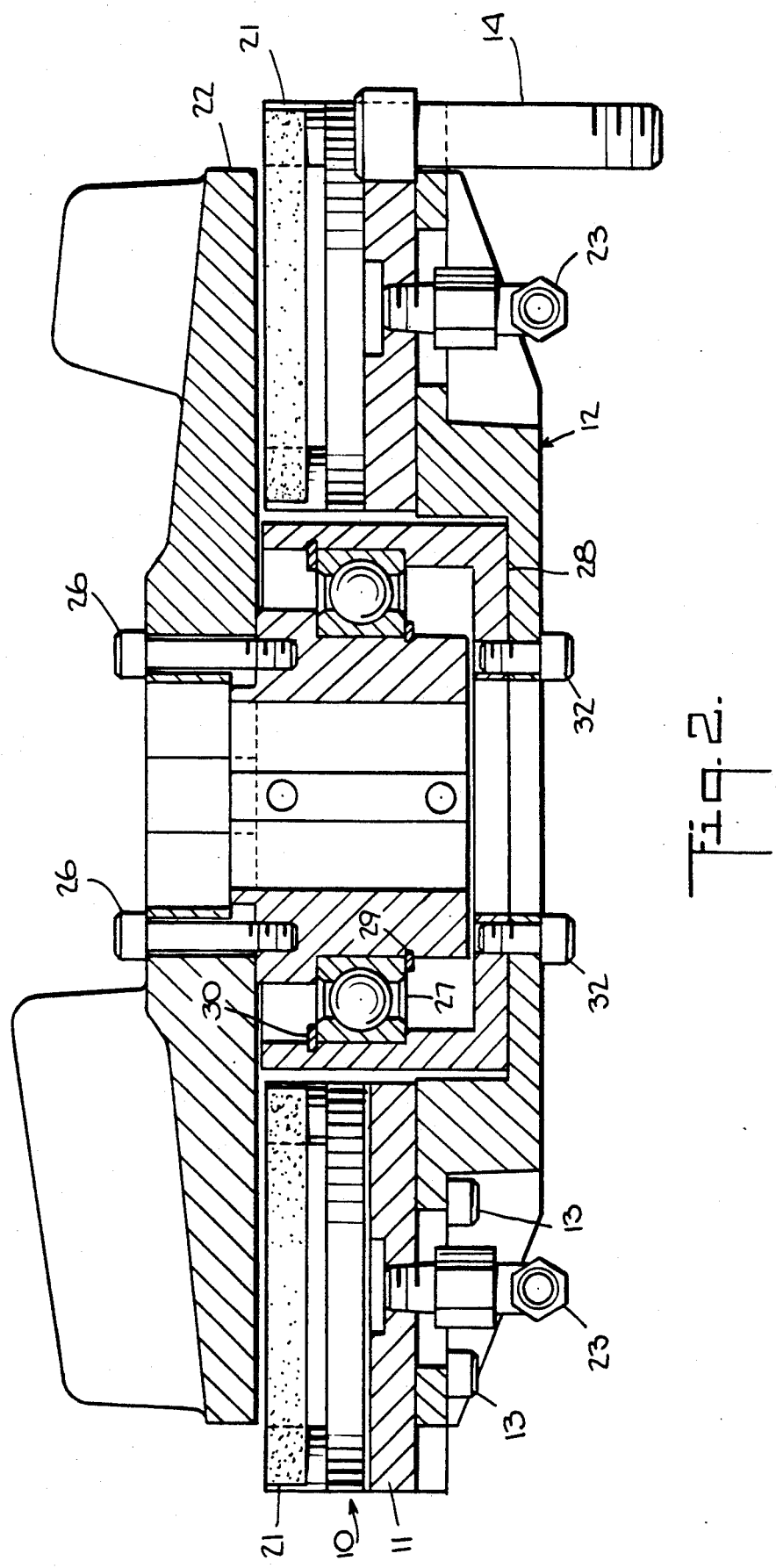
FIG. 2 is a cross-sectional view of the assembled brake of FIG. 1.

FIGS. 1 and 2 show a brake according to the invention. Piston and cylinder assemblies 10, of which six are shown in FIG. 1, although any number, and in larger sizes a number greater than six, can be used, are attached through cylinder base plates 11 to a cylinder mounting plate or spider 12 by mounting screws 13. In the illustrated, preferred embodiment, two screws 13 secure each piston and cylinder assembly 10 to the spider 12. The cylinder mounting plate or spider 12 is, in turn, secured to a machine frame (not shown) by reaction bolts 14 which pass through a slot 15 in the periphery of the spider 12 in the brake configuration of FIGS. 1 and 2.

Each piston and cylinder assembly 10 comprises the cylinder base plate 11, a piston assembly (shown as a diaphragm-type piston) 16, a ring shaped piston collar 17, cylindrical torque posts 18 (two per piston cylinder assembly) and removable torque post screws 19 which serve to secure torque posts 18 to the cylinder base plate 11, which is attached to the spider 12 by mounting screws 13. The torque posts 18 extend from the piston collar 17 through slots 20 in the periphery of a pad 21 of friction material, which upon engagement with the friction disc 22 frictionally couples the disc 22 with the spider 12 and thus to the machine frame, stopping or controlling the relative rotation of the parts. The friction disc 22 is preferably finned as shown for dissipation of the heat generated upon engagement of the brake.

Figure 3:
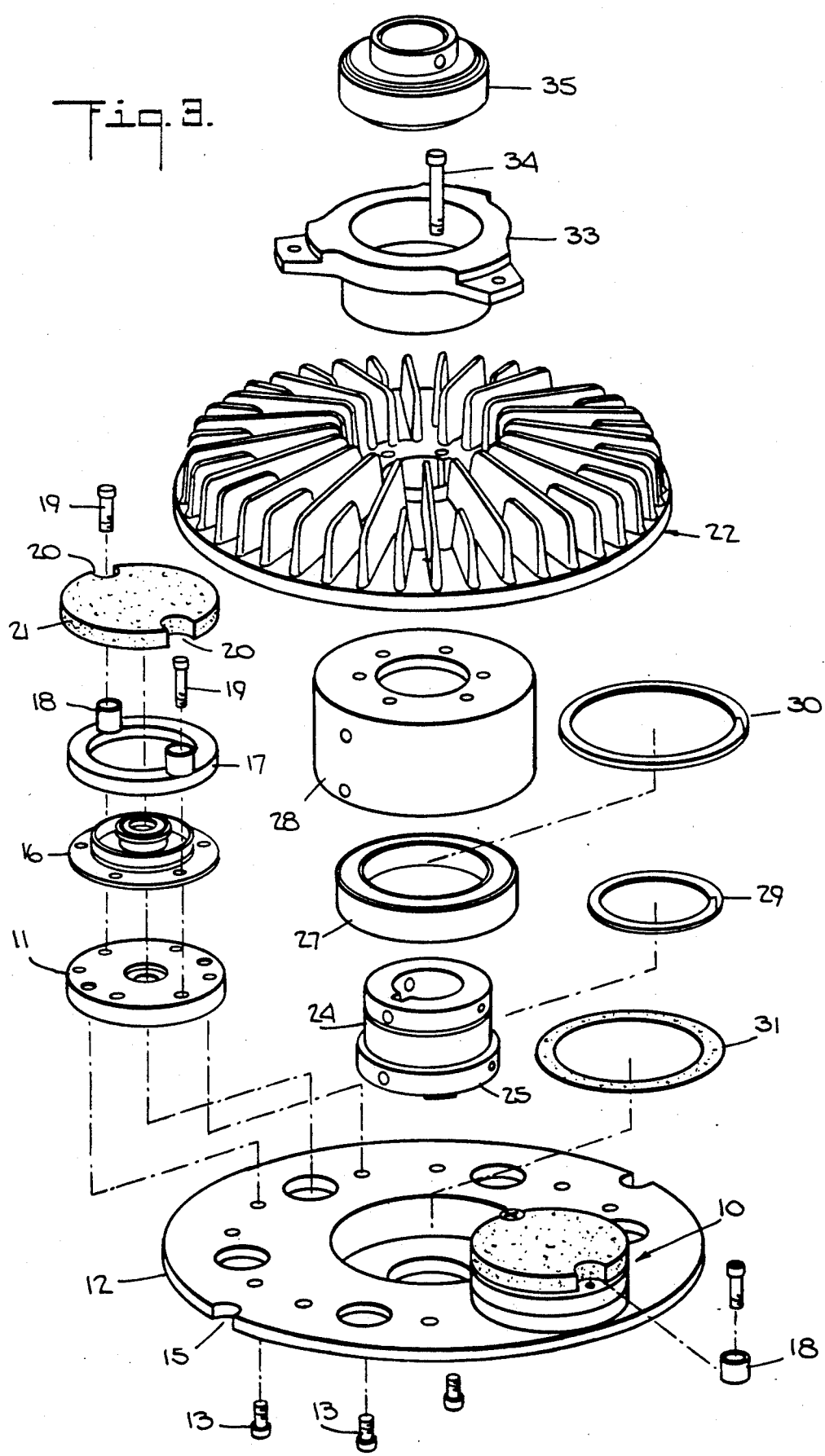
FIG. 3 is an exploded view of the mechanism in a clutch configuration.
Figure 4:
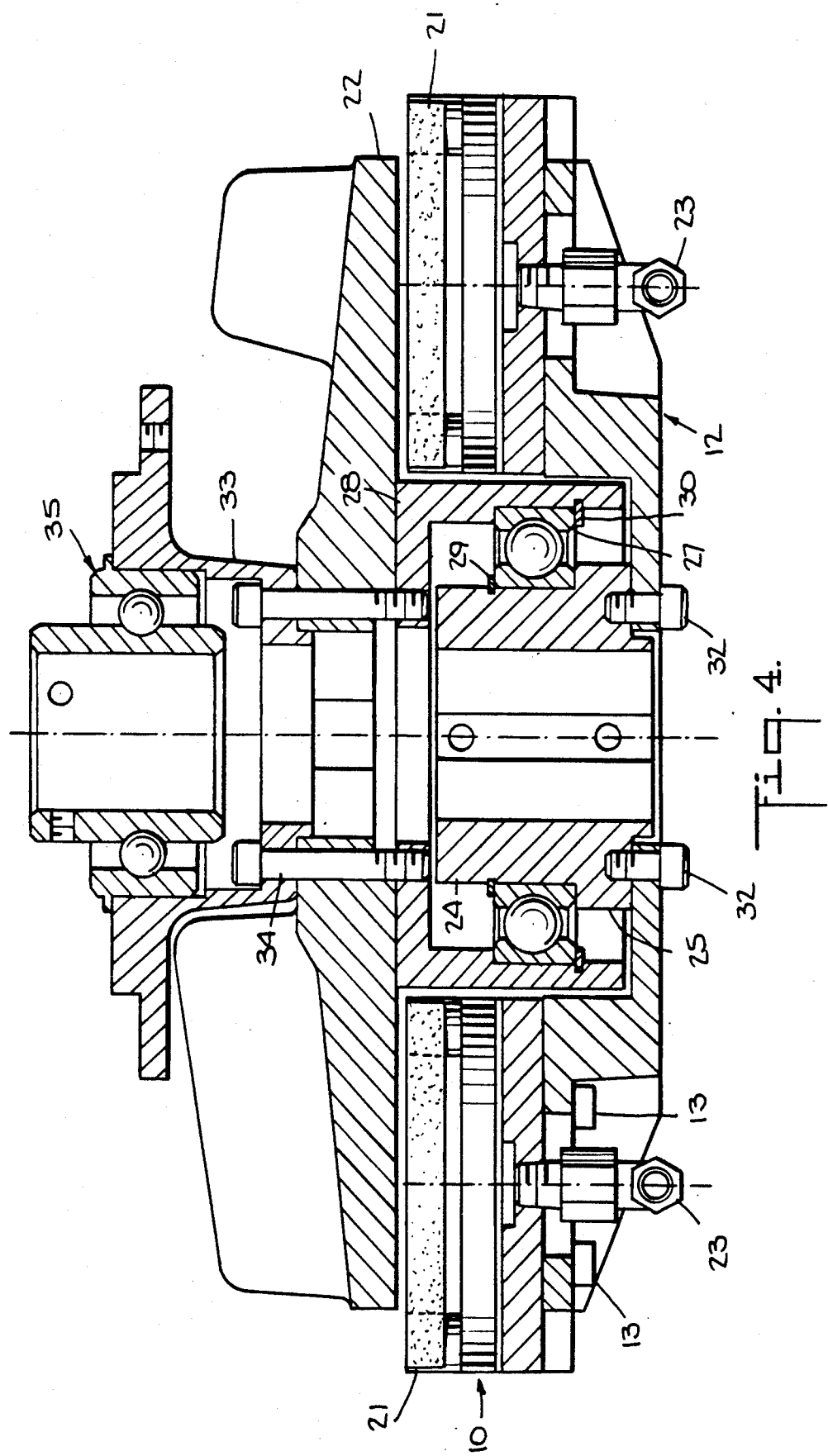
FIG. 4 is a cross-sectional view of the assembled clutch of FIG. 3.

All of the parts described so far, except for the reaction bolts 14, are also present in the clutch configuration of the mechanism as shown in FIGS. 3 and 4. FIGS. 2 and 4 also show the air fittings 23 by means of which air under pressure is introduced in the cylinders of the piston and cylinder assemblies 10 to move the friction pads 21 outward into engagement with the friction disc 22. It is also possible to actuate the piston and cylinder assemblies hydraulically, as will be understood by those acquainted with brakes and clutches.

The central hub 24 is a generally cylindrical body with a peripheral flange 25 at one end. In the brake configuration illustrated in FIGS. 1 and 2, the hub 24 is attached to the friction disc 22 for movement therewith by means of disc hub mounting bolts 26. A bearing 27 and a bearing sleeve 28 surround the central hub 24 and the bearing and bearing sleeve have retaining rings 29 and 30 respectively. A suitable grease gasket 31 is located between the hub 24 and the friction disc 22.

Upon actuation of the piston and cylinder assemblies in the brake configuration of FIGS. 1 and 2, the friction pads 21 engage the friction disc 22 and a shaft (not shown) keyed to the hub 24 is restrained from rotation relative to the machine frame to which the cylinder mounting plate or spider is attached by the reaction bolts 14.

When the mechanism is employed as a clutch the hub 24 and the parts associated therewith, i.e. the bearing 27, bearing sleeve 28, retaining rings 29 and 30 and grease gasket 31 are inverted from the position shown in FIGS. 1 and 2, to that shown in FIGS. 3 and 4, so that the flange 25 of the hub 24 faces the spider 12 and is secured thereto by means of bolts 32 as best shown in FIG. 4. In the brake configuration of FIGS. 1 and 2 the bolts 32 secure the bearing sleeve 28 to the spider.

Reverting to FIGS. 3 and 4 which show the mechanism as a clutch, it can be seen that a sprocket adapter generally designated by reference numeral 33 is attached to the disc 22 by means of fasteners 34 and is carried by bearing 35 on the driven shaft (not shown).

Screws 34 affix the sprocket adapter 33 to the disc 22 and bearing sleeve 28. In this clutch configuration, an additional bearing 35 is provided as shown in FIGS. 3 and 4. The sprocket adapter 33 can thus transmit rotational motion from a drive shaft to the friction disc 22 at a predetermined speed, clutching the spider 12 which is mounted on the central hub 24 and carried by a driven shaft (not shown in the drawings).

The fact that the identical hub and other parts can be used in either a rake or a clutch, by simply turning the hub through 180° and adding the sprocket adapter for use as a clutch, means that fewer special parts need be manufactured, and spare parts inventories are greatly reduced. In the case of either brake or clutch use, the pads of friction material 21 can be easily replaced by removal of the torque posts and screws 18 and 19 without disassembling the entire device, and entire piston and cylinder assemblies 10 are also readily removable.

Various modifications, substitutions and variations of the foregoing preferred embodiments will suggest themselves to those of skill in the art, and therefore are within the spirit and scope of the invention.

What is claimed is:

1. A fluid actuated friction brake comprising a generally cylindrical hub surrounded by a bearing in a bearing sleeve, a finned disc secured by means of bolts extending generally parallel to the axis of said hub to an integral annular radially extending peripheral flange on an end of said hub, said finned disc and hub being rotatable with respect to a mounting plate secured against rotation, said mounting plate carrying a plurality of diaphragm-type piston and cylinder assemblies and fittings for introducing fluid under pressure for actuation of the piston and cylinder assemblies, the pistons of which piston and cylinder assemblies have friction pads for engagement with a flat inner side of said finned disc upon actuation of said piston and cylinder assemblies to stop relative rotation of said hub with respect to said mounting plate, said piston and cylinder assemblies including removable mounting posts for replacement of said friction pads upon removal of said mounting posts.

2. A fluid actuated friction clutch having a generally cylindrical central hub surrounded by a bearing in a bearing sleeve, an integral annular radially extending flange on one end of the hub being secured by means of bolts extending generally parallel to the axis of said hub to a spider carrying a plurality of diaphragm-type piston and cylinder assemblies and fittings for introducing fluid under pressure for actuation of the piston and cylinder assemblies, each piston and cylinder assembly comprising a piston movable with respect to a cylinder, said piston and cylinder assemblies being removably mounted on the spider by means of torque posts attached to screws which extend through said piston and cylinder assemblies whereby said piston and cylinder assemblies are readily removable upon removal of said screws, the clutch being operable for engagement of friction pads carried by pistons of said pistons and cylinder assemblies with a flat face of a friction disc affixed to said bearing sleeve to cause the friction disc and spider to rotate relatively together when the clutch is engaged.

3. A fluid actuated friction coupling mechanism which comprises a generally cylindrical central hub with an integral annular radial flange on one end, a spider secured to said radial flange of said hub by means of bolts extending generally parallel to the axis of said hub, a plurality of diaphragm-type piston and cylinder assemblies mounted on said spider, fittings for introducing fluid under pressure for actuation of said piston and cylinder assemblies, a friction disc secured to a bearing sleeve which surrounds said hub, said friction disc having a flat face in opposed spaced relationship with said spider, for frictional coupling with said spider upon actuation of said piston and cylinder assemblies to prevent relative rotation of said friction disc with respect to said spider, said piston and cylinder assembly comprising two normally fixed, mounting posts secured by removable screws and a pad of friction material held in place by said mounting posts during operation.

4. The mechanism of claim 3 wherein the friction disc has upstanding fins on a disc face opposite said flat face, said fins being generally perpendicular to said disc faces for heat dissipation.

* * * * *